Oct. 25, 1932.   C. H. GOUDISS, JR   1,885,011
FRUIT JUICE EXTRACTOR
Filed July 30, 1932
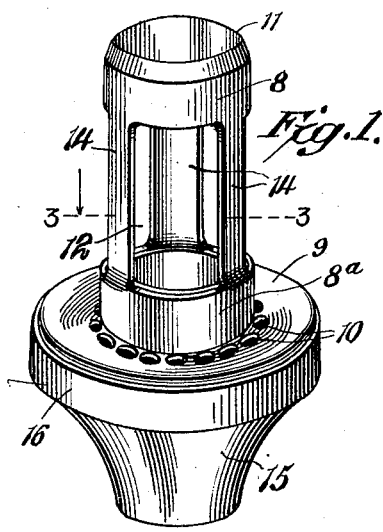
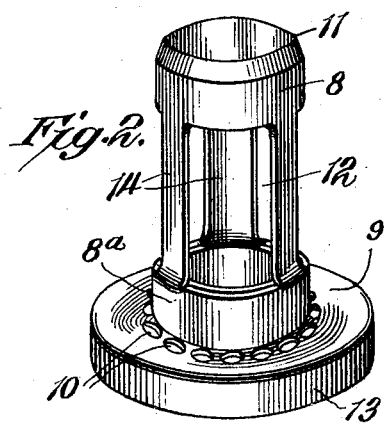
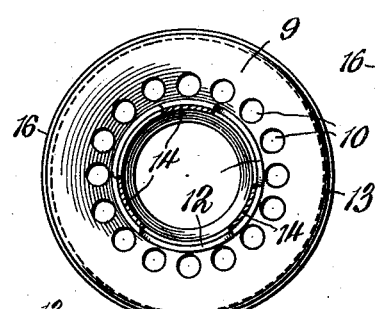
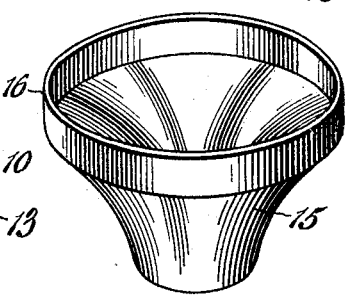
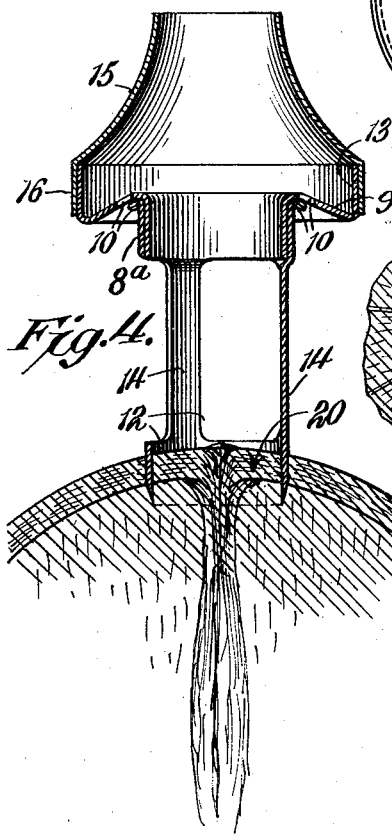
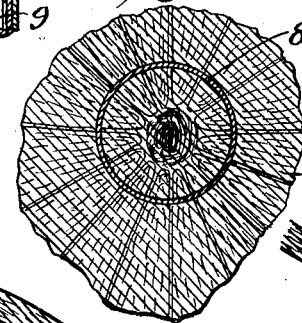
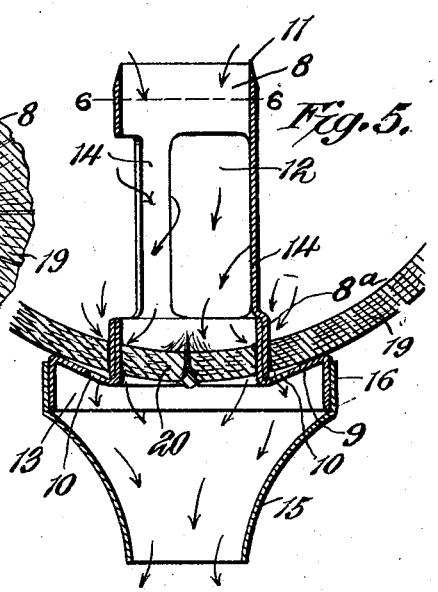
INVENTOR,
Charles H. Goudiss, Jr.,
BY
Mauro & Lewis,
ATTORNEYS Patented Oct. 25, 1932                                                1,885,011

UNITED STATES PATENT OFFICE

CHARLES H. GOUDISS, JR., OF NEW YORK, N. Y., ASSIGNOR TO RICHCAR CORPORATION, OF WILMINGTON, DELAWARE, A CORPORATION OF DELAWARE

FRUIT JUICE EXTRACTOR

Application filed July 30, 1932. Serial No. 626,925.

This invention relates to devices for extracting the juice from citrus or other fruits, especially oranges. It has for its general object to provide a simple, convenient, effective and inexpensive device for that purpose, adapted to both domestic and counter use, the device being so constructed as to be easily cleaned or sterilized.

A special object of the invention is to provide a juice extractor which, while permitting the free discharge of juice through the passage provided therefor, will minimize leakage between the rind of the fruit and the extractor, and will also prevent entrance of seeds and fiber into the discharge passage.

The extractor is preferably formed of two readily separable parts that are held together while in use, by friction only.

Other objects and advantages of the invention will be evident from the following description of a preferred embodiment thereof, reference being had to the accompanying drawing in which—

Fig. 1 is a perspective view of the device;

Fig. 2 is a similar view with the two parts separated;

Fig. 3 is a horizontal section on line 3—3, Fig. 1;

Fig. 4 is a central longitudinal section showing the device partly inserted in an orange;

Fig. 5 is a similar view, inverted, showing the device completely inserted; and

Fig. 6 is a cross section on line 6—6, Fig. 5, showing part of the interior of an orange.

In the embodiment of the invention illustrated in the drawing, the extractor is composed of two parts, which in use are fitted together to form a unitary device, as shown in Fig. 1; said parts being preferably held together by friction only so that they may be readily separated as shown in Fig. 2, for cleaning or sterilizing. Figs. 1 and 2 show the device in the position it occupies when the juice of a fruit is being extracted.

The upper member in those figures, which may be appropriately termed the coring member or penetrating portion, consists of a main body part tubular in shape of approximately uniform diameter throughout having at its lower end a shallow cup-like part or cup portion of considerably larger diameter. The tubular body part comprises two rings 8, 8a, one at each end, connected together by narrow strips 14, with long and wide apertures 12 between, the width of strips 14 being just sufficient to give the necessary strength and rigidity to the body part. Because of the size of these apertures 12 the juice of the fruit has a maximum area of access to the interior of the tube, or in other words, it encounters minimum resistance in entering the same. Moreover, the construction is in this respect simpler and hence less expensive than that of extractors having a large number of relatively small apertures. The object of the construction last referred to is to prevent admission to the discharge passage of seeds and fiber or pith. That object is attained otherwise, according to the present invention, as presently explained, thus making it possible to use large apertures, affording maximum access to the interior of the coring member.

Ring 8 of the coring member has a cutting edge 11 at its upper end.

The cup-shaped part 9 of the coring member is integral with, or is permanently attached to, the ring 8a of the tubular part. Its upper surface is slightly dished or concaved to conform somewhat to the contour of an orange, and there are perforations 10, disposed in a circular row at the lowest part of the dished surface, through which juice can flow into the discharge passage.

The lower member of the device, which may be termed the discharge member or spout portion, has a frusto-conical or funnel-shaped body 15 and a vertical annular flange 16 at the wide end thereof, said flange being of such diameter as to make a liquid-tight joint with the vertical annular portion 13 of the coring member, which it encircles when the two members are fitted together.

While it is preferable to form the device of two separable parts, it is obvious that the main advantages of the invention would be realized in a device wherein the two parts were permanently attached to each other.

In using the device, say to extract the juice of an orange as indicated at 19 (Figs. 4, 5, 6) the cutting edge 11 is forced through the skin or rind along the line of the axis of the fruit (Fig. 4). When the coring member is inserted to its full length in the orange, as shown in Fig. 5, the walls of all the sections thereof, whose edges unite at the axis of the fruit, will have been severed and the juice-containing cells will be in free communication with the interior of tube 8, 8a, through the large apertures 12. The device, together with the orange, being now inverted, so as to occupy the position shown in Fig. 5, the dished part 9 of the coring member will be in contact with the spherical surface of the fruit, so as to assist in the compression whereby the juice is extracted.

The disk 20 of rind or peel severed from the body thereof will at this time occupy the position relative to the coring member shown in Fig. 5; that is to say, it will lie within the ring 8a. Thus it will act as a stop or fender to prevent passage of seeds or pith into the discharge member, while allowing sufficient space between its edge and the inner wall of tube 8a for the juice to flow into the discharge passage.

As shown, the ring 8a is somewhat greater in diameter externally than ring 8, and hence will make a comparatively close fit with the adjacent edge of the rind. Nevertheless, some of the juice will find its way or be forced between tube 8a and the rind into the concavity formed by the upward curvature of surface 9, whence it passes via holes 10 into the discharge passage 15.

The drawing is not made to scale, the dimensions, actual and relative, being obviously variable. It has been found that, for an extractor intended for use with oranges, the following dimensions are effective: length over all, 2½ inches; maximum diameter (middle portion of device) 1½ inches; internal diameter of tube ¾ inch.

It is obvious that modifications, other than those indicated above, may be made in details of construction of the device without departing from the spirit and scope of the invention as set forth in the appended claims.

What is claimed is:

1. A fruit juice extractor, comprising a coring member having a tubular penetrating portion provided at one end with a circular cutting edge and at its other end with a supporting portion of larger diameter than said penetrating portion; and a discharge member attached to said coring member, said discharge member being of larger diameter where it joins the supporting portion of said coring member than the penetrating portion thereof; said penetrating portion being of approximately uniform interior diameter throughout, so that when it is fully inserted in the fruit the disk severed thereby from the skin or rind serves as a stop or fender between the coring member and the discharge member.

2. A fruit juice extractor, comprising a tubular penetrating portion adapted to be inserted in the fruit and having a cup portion attached thereto; a spout portion attached to said cup portion, and adapted to remain on the outside of the fruit when said penetrating portion is inserted in the fruit; said penetrating portion being of approximately uniform interior diameter, whereby it forms and passes into the fruit through an approximately annular opening in the outer surface thereof; said cup portion being formed to surround the opening made in the fruit by the penetrating portion and being in communication with the interior of said spout portion, so that juice escaping from the fruit around the exterior of said penetrating portion is caught by the cup portion and conducted thereby into the spout portion.

3. A fruit juice extractor, comprising a tubular penetrating portion adapted to be inserted in the fruit and having a cup portion attached thereto; a spout portion attached to said cup portion and adapted, together with said cup porion, to remain outside the fruit when said penetrating portion is inserted therein; said cup portion being in communication with the interior of said spout portion and surrounding the opening made in the fruit by the penetrating portion, whereby juice escaping from the fruit around the exterior of said penetrating portion is caught by the cup portion and conducted thereby into the spout portion.

4. A fruit juice extractor, comprising a penetrating portion adapted to be inserted in the fruit and having passageway to conduct juice from the interior to the exterior of the fruit; a cup portion attached to said penetrating portion; a spout portion attached to said cup portion and communicating with said penerating portion; said cup portion and spout portion being adapted to remain outside the fruit when said penetrating portion is inserted therein; said cup portion being in communication with the interior of said spout portion and surrounding the opening made in the fruit by the penetrating portion, whereby juice escaping from the fruit around the exterior of said penetrating portion is caught by the cup portion and conducted thereby into the spout portion.

5. A fruit juice extractor, comprising a coring member having a tubular body part of approximately uniform interior diameter with a cutting edge at one end thereof and having a cup-shaped part at the other end, which part is of greater diameter than the tubular part, the cup-shaped part of said coring member having apertures which communicate with the side opposite the cup of the cup-shaped part.

6. A fruit juice extractor, comprising a coring member having a tubular body part of approximately uniform interior diameter with a cutting edge at one end thereof and having a cup-shaped part at the other end, which part is of greater diameter than the tubular part, a discharge member, and means to detachably join the said discharge member to the cup-shaped part of said coring member; the cup-shaped part of said coring member having apertures which communicate with the interior of the discharge member.

7. A fruit juice extractor, comprising a coring member having a tubular penetrating portion of approximately uniform interior diameter, provided with large apertures and having at one end a circular cutting edge and at the other a supporting portion of larger diameter than said penetrating portion; and a discharge member attached to said coring member, said discharge member being of larger diameter at the end adjacent to the supporting portion of said coring member than the body part of said coring member whereby, when inserted in an orange or other like fruit, the disk severed by said cutting edge from the skin or rind serves as a stop or fender between said coring member and said discharge member.

8. A fruit juice extractor, comprising a coring member having a tubular penetrating portion provided at one end with a circular cutting edge and at its other end with a supporting portion of larger diameter than said penetrating portion; and a discharge member attached to the supporting portion of said coring member; said discharge member having a diameter corresponding to that of said supporting portion where it joins the same, so that both said supporting portion and said discharge member remain outside the fruit when said penetrating portion is inserted therein; said penetrating portion being of approximately uniform interior diameter and of larger exterior diameter at the end adjacent said supporting portion than at the opposite end.

In testimony whereof I have signed this specification.

CHARLES H. GOUDISS, Jr.